United States Patent
Welle

(10) Patent No.: US 12,372,393 B2
(45) Date of Patent: Jul. 29, 2025

(54) SUBMERSIBLE AUTONOMOUS FILL-LEVEL MEASUREMENT SYSTEM

(71) Applicant: VEGA Grieshaber KG, Wolfach (DE)

(72) Inventor: Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 277 days.

(21) Appl. No.: 17/906,329

(22) PCT Filed: Mar. 5, 2021

(86) PCT No.: PCT/EP2021/055619
§ 371 (c)(1),
(2) Date: Sep. 14, 2022

(87) PCT Pub. No.: WO2021/185601
PCT Pub. Date: Sep. 23, 2021

(65) Prior Publication Data
US 2023/0098780 A1  Mar. 30, 2023

(30) Foreign Application Priority Data

Mar. 18, 2020 (WO) .................. PCT/EP2020/057457

(51) Int. Cl.
*G01F 23/64* (2006.01)
*G01F 23/18* (2006.01)

(52) U.S. Cl.
CPC .................. *G01F 23/185* (2013.01)

(58) Field of Classification Search
CPC ...... G01F 23/185; G01F 23/00; G01F 23/296; G01F 23/64; G01F 23/0007; G01F 23/14;
(Continued)

(56) References Cited

U.S. PATENT DOCUMENTS

| 4,804,944 A | * | 2/1989 | Golladay | G08B 21/182 |
| | | | | 250/900 |
| 5,408,874 A | * | 4/1995 | Fleck, Sr. | G01F 23/68 |
| | | | | 367/908 |

(Continued)

FOREIGN PATENT DOCUMENTS

| CN | 109990828 A | * | 7/2019 | ............... H04Q 9/00 |
| CN | 111377056 A | * | 7/2020 | ............... A01M 7/00 |

(Continued)

OTHER PUBLICATIONS

European Office Action issued Oct. 5, 2023 in European Patent Application No. 21709028.1, 7 pages.

(Continued)

*Primary Examiner* — Robert R Raevis
(74) *Attorney, Agent, or Firm* — Oblon, McClelland, Maier & Neustadt, L.L.P.

(57) ABSTRACT

A self-sustaining sensor is provided, being configured to detect a fill level, a limit level, or a pressure of a medium or to measure an interface of a mixture of media in a transport container, the sensor including: a closed housing configured to be submerged in the medium; and a sensor element arrangement including one or more sensor elements arranged in or on the housing, in which the sensor is configured to rest on a bottom of the container and/or to float on a separating layer of the mixture of media during measurement, without being fixed to the container. A self-sustaining fill level measurement system, limit level measurement system, or pressure measurement system is also provided. A method for detecting a fill level or a limit level or a pressure of a medium or for interface measurement of a mixture of media in a transport container is also provided.

13 Claims, 4 Drawing Sheets

Figure 1:
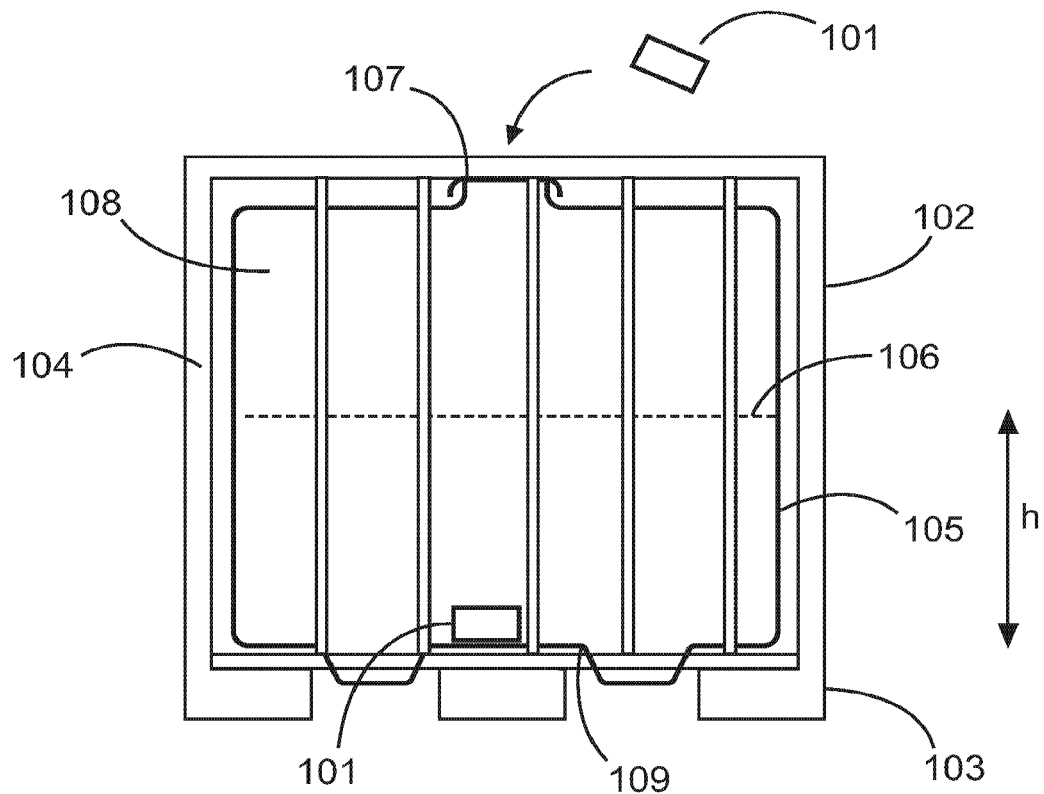

(58) Field of Classification Search
CPC ..... G01F 23/30; G01F 23/68; G01L 19/0627; G01N 23/64
USPC .... 73/299–301, 322.5, 865.1, 290, 291–334, 73/700–756; 340/612, 614, 615, 623–626
See application file for complete search history.

(56) References Cited

U.S. PATENT DOCUMENTS

| | | |
|---|---|---|
| 2011/0277546 A1 | 11/2011 | Armitage et al. |
| 2018/0224341 A1 | 8/2018 | Sakamoto et al. |
| 2023/0025839 A1* | 1/2023 | Welle ..................... H05K 5/069 |

FOREIGN PATENT DOCUMENTS

| | | | |
|---|---|---|---|
| DE | 29802236 U1 | 4/1998 | |
| DE | 10 2016 209 837 A1 | 12/2017 | |
| DE | 20 2018 106 655 U1 | 3/2019 | |
| DE | 20 2019 001 575 U1 | 5/2019 | |
| EP | 2 144 044 A1 | 1/2010 | |
| EP | 2180299 A1 * | 4/2010 | ............ A61J 7/0418 |

OTHER PUBLICATIONS

International Search Report issued Apr. 20, 2021, in PCT/EP2021/055619 filed Mar. 5, 2021, 2 pages.
International Preliminary Report on Patentability and Written Opinion issued Sep. 29, 2022 in PCT/EP2021/055619 (submitting English Translation only), 8 pages.

* cited by examiner

SUBMERSIBLE AUTONOMOUS FILL-LEVEL MEASUREMENT SYSTEM

REFERENCE TO RELATED APPLICATIONS

This application is a U.S. national stage application of PCT/EP2021/055619, filed on Mar. 5, 2021, which is based upon and claims the benefit of priority to International Patent Application No. PCT/EP2020/057457, filed Mar. 18, 2020, the entire contents of each of which are incorporated herein by reference in their entirety.

FIELD OF THE INVENTION

The invention relates to process measurement technology and process automation in an industrial environment. In particular, the invention relates to a self-sufficient, i.e. autarkic, sensor, the use of a self-sufficient sensor for detecting a filling level, a limit level or a pressure of at least one medium or for interface measurement of a medium mixture in a transport container, a self-sufficient filling level, limit level or pressure measurement system and the use of a filling level, limit level or pressure measurement system for interface measurement of a medium mixture in a transport container. Furthermore, the invention relates to the method for detecting a filling level or a limit level or a pressure of at least one medium or for interface measurement of a medium mixture in a transport container, a program element and a computer-readable medium.

TECHNICAL BACKGROUND

Electronic level sensors, fill level sensors or pressure sensors are widely used today and can be set up autarkic. For this purpose, they have an internal power supply which makes them independent of an external power supply. For communication, in particular a wireless communication interface can be provided, for example in the form of a WLAN interface or a Bluetooth interface.

The point level sensors, pressure sensors or level sensors are typically located at a container opening or the container wall. However, they can also be located outside the container, especially if it is a plastic container, for example an IBC container.

Radar sensors used for point level, fill level or pressure determination can beam the transmitted signal through the wall of the plastic container and then wirelessly transmit the calculated measured value to a cloud or external server.

Known, autonomously operating fill level sensors are increasingly used for monitoring the fill level and in mobile, transportable containers. The majority of embodiments used to date are based on a radar-based distance sensor, which can detect the fill level in a container from the outside through the container wall and transmit it to a cloud via a wireless communication device. However, the sensors available to date often require mechanical attachment to the container. Since the large number of existing transportable containers do not have any specialized mounting devices for accommodating a level sensor, the mounting is generally carried out by gluing, clamping or tying to the respective container.

SUMMARY

It is an object of the present invention to simplify the determination of limit levels, pressures or levels and interface monitoring in a process vessel.

This object is solved by the features of the independent patent claim. Further embodiments of the invention result from the dependent patent claims and the following description of embodiments.

A first aspect of the present disclosure relates to an autarkic, i.e. stand-alone, self-sufficient sensor configured to detect a level or a threshold level or a pressure of at least one medium or to measure an interface of a mixture of media in a transport container. The self-sufficient sensor comprises a closed housing and a sensor element arrangement comprising one or more sensor elements. The closed housing is adapted to be submerged in the at least one medium. The one or more sensor elements are arranged in or on the housing. The sensor is adapted to rest on the bottom of the container and/or to float on a separation layer of the medium mixture during measurement, without attachment to the container.

The self-sufficient sensor may be configured such that the sensor may be introduced or inserted into the container through a container opening, and may sink into the medium to be measured under the influence of gravity. In other words, the self-sufficient sensor may be arranged to be completely surrounded by at least one of the at least one media within the container during at least one phase of operation. When the sensor reaches the bottom of the container, its shape and weight distribution causes the sensor to assume a standing position in which at least one of the sensor elements can measure unobstructed by the container wall. For example, the shape and weight distribution is such that the sensor can always stand upright, for example in the shape of a standing man. By positioning the self-sufficient sensor within the container, a very simple type of mounting can be provided, while at the same time reliably preventing uncontrolled detachment during transport.

The stand-alone sensor can, for example, be set up to detect a liquid as a medium or a filling material. Alternatively, it can also be provided that the medium can be a bulk material. Thus, after installation inside the container, the self-sufficient sensor can be gradually covered by the bulk material and can wirelessly transmit the measured value(s) through the bulk material medium during the measurement.

The housing may be configured to prevent the medium from entering the interior of the self-sustaining sensor.

The self-sustaining sensor may be used in a transport container. For example, as one of the most commonly used types of container, a transport container may be a so-called intermediate bulk container, briefly referred to as an IBC container. Alternatively, the self-sufficient sensor may be used in other containers, for example in a metallic container.

According to a further embodiment, the density of the sensor is between the density of water and the density of an oil.

The media mixture may be a heterogeneous solution comprising at least two liquids or two media, for example a water-based medium such as water and a hydrocarbon such as an oil, in clearly delineated phases. This may form a multi-layer solution system with a separation layer to delineate the different media. Alternatively, the media mixture may comprise two bulk media with a separation layer.

It may be envisaged that the self-sustaining sensor is arranged to detect or determine the level of the respective media and the boundary layer between the media by a change in density in the different media of the media mixture, either at the bottom of the container or floating on the separating layer of the mixture.

According to a further embodiment, the sensor element arrangement comprises two sensor elements arranged opposite each other.

According to a further embodiment, the two sensor elements are a first pressure sensor element and a second pressure sensor element. The first pressure sensor element is arranged to determine a first measured value and the second pressure sensor element is arranged to determine a first measured value and a second measured value of the at least one medium.

The self-sustaining sensor may be arranged in the medium such that the sensor may stand upright at the bottom of the container, and the first pressure sensor element and the second pressure sensor element may each be at a different height position in the medium. The difference in height between the first and second pressure sensor elements may correspond to the distance d between the two pressure sensor elements when the self-sustaining sensor is standing upright in the medium.

Through the targeted use of different physical effects, it may be possible, for example, to detect the level of a medium in a container with the sensor and to transmit it to the outside using wired or also wireless communication devices of a higher-level control system.

According to a further embodiment, the outer shape of the housing and the weight distribution in the stand-alone sensor, in particular in the case of a point level sensor or pressure sensor, is designed in such a way that at least one of the sensor elements can always measure in the product or medium unhindered by the vessel wall. For this purpose, a distance grid may be provided outside the housing or on the upper side and/or on the lower side on the housing.

The distance grid can further be arranged to prevent the sensor from being washed out during an emptying of the container by a corresponding expansion of the mechanical dimensions of the self-sufficient sensor, and to prevent a possible falsification of the measured values by a possible resting of the self-sufficient sensor on the container bottom under load of one of the measuring cells. Thus, a simple and at the same time safe installation or mounting of the self-sufficient sensor on or in a container can advantageously be made possible.

According to a further embodiment, the housing is spherical.

According to a further embodiment, the center of gravity of the self-sufficient sensor, in particular the point level sensor or pressure sensor, is located below the center of the housing.

According to a further embodiment, the housing has a polygonal cross-section, in particular a hexagonal or octagonal cross-section.

According to a further embodiment, the housing comprises an indentation in which one of the sensor elements is arranged.

According to a further embodiment, the sensor element is protected from contact with the bottom of the container by the indentation.

According to a further embodiment, the housing is mirror symmetrical.

According to a further embodiment, the self-sustaining sensor further comprises an evaluation device which is arranged in the housing and is set up for determining a third measured value on the basis of the first measured value and/or the second measured value.

For example, the first measured value of the first pressure sensor element can be the first pressure value $P_1$ and the second measured value of the second pressure sensor element can be the second pressure value $P_2$. The stand-alone sensor may be arranged to transmit the two pressure values from the two pressure sensor elements to the evaluation device. The evaluation device can be set up to calculate the third measured value, for example the filling level, by comparing and evaluating the determined first and second pressure values $P_1$ and $P_2$ according to a pressure measurement principle, because the parameters used, such as the density $\rho$ of the medium, the pressure of the superimposed atmosphere $P_{At}$ and the distance d between the two pressure sensor elements, are known.

By providing the second pressure sensor element, the measurement error of the self-sufficient sensor can be advantageously minimized and the measurement accuracy significantly increased, in that the evaluation device can be set up to continuously detect the density $\rho$ of the medium in the container on the basis of the absolute difference of the two pressure values, which is divided by the product of the acceleration due to gravity and the distance d. The second pressure sensor element can be used to measure the density of the medium in the container.

According to a further embodiment, the self-sustaining sensor further comprises a communication device arranged in the housing and adapted to wirelessly transmit a determined measured value through the housing to the outside.

According to a further embodiment, the communication device is arranged to transmit the radio signal using LPWAN or long range narrowband radio technology with a radio frequency below 1 GHz.

The autonomous sensor or the communication device can be set up to transmit the radio signal using a low-frequency narrowband radio technology, such as LPWAN, or a long range narrowband radio technology with a radio frequency below 1 GHz, in particular below 500 MHz. The low frequency narrow band radio technology may be available at low cost and low power by integration in commercially available semiconductor devices. For example, an LPWAN may be LoRa, Sigfox, NB-IoT, or MIOTY. However, other radio technologies below 1 GHz may also be used. In principle, the range of the aforementioned technologies may be massively reduced under the influence of a medium to be passed between a transmitter, such as the autonomous sensor, inside the container and a receiver outside the container, especially in the case of the conductive medium. However, it is envisaged that the reduced range may still be sufficient to reach a base station installed in the vicinity of the container.

According to a further embodiment, the self-sustaining sensor further comprises a gateway configured to be disposed on the container and to receive the radio signal from the communication device and transmit it to a receiver external to the container.

It may be intended to transmit the measured values of the autonomous sensor via wireless communication technology through the medium and the container wall in the direction of a receiver, for example a gateway. Due to possibly existing conductivities of the medium, the signal may be strongly attenuated when passing through, which may be accepted with regard to the short distance in the medium and the high attenuation of the signals due to the radio technology, but which is acceptable. It should be noted that an application in a metallic container, on the other hand, cannot be considered due to the principle of complete shielding of the radio signals.

It may also be provided that the gateway may be arranged or mounted, for example, on a metallic container or on the container wall or on the lid of the container, and the radio signal may be received by the communication device of the autonomous sensor and/or may be further transmitted to a receiver external to the container. The lid of the container may be configured as a replacement lid. Thus, advantageously, the self-sufficient sensor and a self-sufficient level, limit level or pressure measuring system in which the self-sufficient sensor is used can also be applied with the gateway to the metallic container, even if the metallic container often cannot be provided with additional openings at arbitrary points due to its construction. Thus, it can be a container gateway integrated in the lid.

Alternatively, the gateway can be provided internally in the vicinity of the opening of the container or on the inside of the lid and be set up to receive the radio signal of the sensor located in the container and to radiate it further outwards via a second antenna, which can be provided on the outside of the lid. In contrast to a direct installation of, for example, a radar level sensor in the lid, it is thus advantageous that the functionality of the level measurement can be ensured both with the container lid closed and with the container lid open. The level measurement can thus be continued without restriction, in particular during filling or emptying, via a hose inserted into the opening.

According to a further embodiment, the self-sustaining sensor further comprises a power supply arranged in the housing and adapted to be activated by a timer arranged in the housing at a predetermined time interval.

Thus, wireless communication can occur between the self-sustaining sensor within the vessel and a receiver located outside the vessel. Compared to wired communication, where the energy required for the measurement is always to be in use, battery-powered sensors for monitoring level, limit level or pressure values may become increasingly important with the availability of more advanced, energy-saving wireless technologies. Particular advantages arise for applications in the field of process automation in industrial environments such as logistics.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

A subarea of process automation in the industrial environment concerns logistics automation. With the help of distance and angle sensors, processes within a building or within an individual logistics facility are automated in the area of logistics automation. Typical applications are, for example, systems for logistics automation in the area of baggage and freight handling at airports, in the area of traffic monitoring (toll systems), in retail, parcel distribution or also in the area of building security (access control). What is meant by the examples listed above is that presence detection in combination with precise measurement of the size and position of an object is required by the respective application side. Sensors based on optical measurement methods using lasers, LEDs, 2D cameras or 3D cameras that measure distances according to the time-of-flight (ToF) principle can be used for this purpose.

Another subarea of process automation in the industrial environment concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

For example, the continuous, automated monitoring of the fill levels in mobile containers and the preferably wireless transmission of the values to a central evaluation point in the area of goods logistics can be used to implement cross-location inventory management in a simple manner. Using the recorded data, significant cost reductions can be achieved depending on the respective problem, for example if the route for delivery vehicles to supply replenishments can be optimized.

The self-sufficient sensor may further comprise a timer, a logic circuit arranged between the timer of the evaluation device, and a switching element arranged to connect the power supply, the logic circuit and the evaluation device. Furthermore, it may be provided that an evaluation device or a processor may establish a latch signal for activating the power supply.

According to a further embodiment, the self-sustaining sensor further comprises a tilt sensor element arranged in the housing and adapted to determine the tilt of the level or limit sensor or pressure sensor.

The evaluation device can be set up to take into account in particular also the inclination of the self-sufficient sensor relative to the perpendicular determined by the inclination sensor element and to determine the filling level h with higher accuracy. The provision and use of the inclination sensor element can be advantageous, in particular if a mobile or stationary container has a bottom surface which is not flat.

It may also be possible that an undesired release of the mounted sensor may occur, for example, during loading of a container or during transport. The IBC container is characterized by a volume- and weight-optimized design, which may in particular allow loading with fork lift trucks on a truck. During the loading and unloading operations, minor pile-ups may repeatedly occur due to carelessness, which may cause mechanical deformation of the container and/or detachment of a measuring sensor mounted on the outside of the container. As a result, the self-sufficient sensor may not be arranged upright, but at an angle on the container base.

It may also be possible that the self-sufficient sensor, after being placed in the container under the influence of gravity, may sink in a largely uncontrolled manner in the direction of the container bottom through the medium and remain in a random position on the container bottom. Consequently, it cannot be assumed that the self-sufficient sensor remains in a predefined angular position relative to the perpendicular on the container bottom. By taking into account a fourth measurement value, which is determined by the tilt sensor element and may be, for example, a tilt angle of the sensor, an improvement of the measurement accuracy or also an output of an error signal may be controlled during the measurement.

Another aspect relates to the use of a self-sustaining sensor for detecting a level or a threshold level or a pressure of at least one medium or for interface measurement of a mixture of media in a transport container.

According to a further embodiment, the transport container is a vehicle tank.

Another aspect relates to the use of a self-sustaining sensor for detecting a level or a boundary level or a pressure for groundwater level measurement.

Explicitly, applications in any form of mobile container such as tank wagons, tank carts, drums, barrels, ship, aircraft or vehicle tanks or other mobile containers may be included in the context of the invention.

It may also be envisaged to advantageously apply the principles of the present invention in the context of stationary mounted tanks. In particular, there may be advantages in difficult mounting situations in highly angled or poorly accessible tank constellations or in monitoring groundwater levels. An application of the self-sufficient sensor may also be advantageous for highly angled, poorly accessible fuel tanks.

Another aspect relates to a self-sufficient level, point level or pressure measurement system comprising a first self-sufficient sensor and a second self-sufficient sensor. The first self-sufficient sensor has a different density than the second self-sufficient sensor.

The stand-alone level, point level or pressure measurement system can be set up for interface measurement of a mixture or interface monitoring of a separation process in a process vessel.

The mixture may comprise two media, namely a first medium, for example a carbohydrate material such as an oil having a first density $\rho_1$ and a second medium, for example a water-based liquid such as water, having a second density $\rho_2$. The water is overlaid by the oil and a separation layer is located between the two mutually immiscible media.

Furthermore, the self-sufficient level, point level or pressure measurement system may be arranged such that the first self-sufficient sensor has a density between the first density $\rho_1$ and the second density $\rho_2$, for example 0.9 g/cm$^3$, while the second self-sufficient sensor has a density greater than the second density $\rho_2$, for example greater than 1 g/cm$^3$. With the different densities, the second self-sufficient sensor may sink to the bottom of the container during assembly or measurement in the container, whereas the first self-sufficient sensor may float on the interface between the first medium oil and the second medium water. The second self-sufficient sensor can be designed according to the principles described above, for example on the basis of one or more pressure measurements, to determine the first filling level $h_1$ of the first medium on the basis of the first density $\rho_1$ of the first medium, to determine the second filling level $h_2$ of the second medium on the basis of the second density $\rho_2$ of the second medium, and to send or transmit the two filling levels wirelessly to the outside and/or directly to the second self-sufficient sensor, which can have an evaluation device with a receiving unit for receiving the radio signal or the measured value from the first sensor.

In particular, a receiver may be provided which may be arranged outside the container or below the container or external to the container to receive the radio signals and the measured values from the first and second autonomous sensors.

For example, a receiver external to the container can receive the measured value or the first fill level $h_1$ of the first self-sufficient sensor as an evaluation device or as a cloud and store it for further processing. The second self-sufficient sensor may be set up to receive this measured value, namely the first filling level $h_1$, directly from the first self-sufficient sensor or via the receiver by means of a further communication device and to determine a second measured value, for example the second filling level $h_2$, on the basis of the received measured value and using measurement principles which are identical or different to those of the first self-sufficient sensor. For example, the pressure value at the bottom of the container, the second fill level $h_2$ up to the interface can be determined using the known second density $\rho_2$ of the second medium and from this the total fill level or the total fill level h can be determined and transmitted wirelessly to the outside. The measured values can be received by a receiver attached to the outside of the container or an external receiver, processed further and/or, in particular, transmitted to an inventory control system or a cloud.

According to a further embodiment, the self-sustaining level, limit level or pressure measurement system further comprises a limit level sensor adapted to be mounted laterally on the inner wall of the container and to output a warning signal to the outside.

The level sensor can be a tuning fork sensor, for example, which can be mounted in the upper area of the container via a magnetic holder. The level sensor can also be set up to provide or output an alarm signal to the outside when the level value $h_G$, which can be set on the installation side, is reached. The magnetic holder can also be used with a conventional plastic tank if a corresponding mechanically fixed or height-adjustable metal plate can be provided on the outside of the tank.

Thus, the stand-alone level, point level or pressure measuring system can be used for point level monitoring.

It may be noted at this point that a stand-alone sensor may be arranged to determine a level or level limit value using different physical principles. Conceivably, for example, capacitive or conductive sensor elements, vibronic sensor elements, temperature sensor elements or chemical sensor elements such as PH value sensor elements may be provided as an alternative to the pressure sensor elements.

According to a further embodiment, the invention relates to the use of a level, point level or pressure measurement system for interface measurement of a media mixture in a transport container.

Another aspect relates to a method for detecting a level or a boundary level or a pressure of at least one medium or for interface measurement of a mixture of media in a transport container, comprising the steps of: Providing and arranging a self-sufficient sensor comprising a closed and a sensor element arrangement with one or more sensor elements to rest on the bottom of the container and/or to float on a separation layer of the medium mixture without being fixed to the container, and carrying out the measurement when the self-sufficient sensor is activated by an internal power supply at a predetermined time interval by means of a timer.

The sensor element arrangement comprises two sensor elements, a first pressure sensor element and a second pressure sensor element, arranged opposite each other in the housing of the self-sufficient sensor.

The method may further comprise the steps of checking whether the current time T of a timer is greater than or equal to the next pre-parameterized wake-up time $T_{Wake}$, if so, followed by powering the evaluation device or processor and loading a program.

The method may further comprise the steps of reading a tilt angle by means of a tilt sensor element of the self-sustaining sensor, and determining the density $\rho$ of the surrounding medium.

According to a further embodiment, the method further comprises the following steps: determining a first measured value of the at least one medium by means of the first pressure sensor element, determining a second measured value of the at least one medium by means of the second pressure sensor element, and determining a third measured value by means of an evaluation device using the first measured value and/or the second measured value.

For example, the first measured value and the second measured value may be the first pressure value $P_1$ and the second pressure value $P_2$, respectively. A comparison of the first and second measured values $P_1$ and $P_2$ can be carried out in order to check whether the autonomous sensor is upright or upside down, or whether the first pressure sensor element and the second pressure sensor element are arranged at different heights, or whether $P_1 > P_2$ or $P_1 > P_2$. The third measured value, for example the filling level h, is determined by means of an evaluation device on the basis of the first and second measured values. In the case of $P_1 = P_2$, it may be provided to determine the level h of the medium on the basis of one of the first and second pressure values. Alternatively or additionally, it can be provided that, due to the same height positions of the first and second pressure sensor elements, no more density measurement is carried out, an error message is output, a last known density value is used and/or a density value parameterised in advance is used to determine the filling level h.

The method may further comprise the steps of: activating a communication device, wirelessly transmitting the level h to the outside, transmitting the time of the next measurement of the processor or the evaluation device to the timer, and deactivating the communication device.

Following this, a switching element of the autonomous sensor is reopened by the processor, which deactivates the entire system except for the timer, and thus assumes the state of maximum energy saving. This may maximize the life of the battery or accumulator of the autonomous sensor, which may in particular allow the autonomous sensor to be designed with a fixed battery that allows operation for many years. This can advantageously simplify the manufacturing, reduce the costs during the manufacturing and during the operation and ensure the tightness of the sensor housing in a simple way.

Another aspect of the invention relates to a program element which, when performed on a processor of a self-sustaining sensor, instructs the self-sustaining sensor to perform the steps of the method described above.

Another aspect of the invention relates to a computer-readable medium on which a program element is stored.

In the following, embodiments of the present disclosure are described with reference to the figures. If the same reference signs are used in the figure description, these describe the same or similar elements. The illustrations in the figures are schematic and not to scale.

SHORT DESCRIPTION OF THE FIGURES

FIG. 1 schematically shows a stand-alone sensor for level, limit level or pressure measurement of at least one medium in a transport container according to one embodiment.

Figure 2:
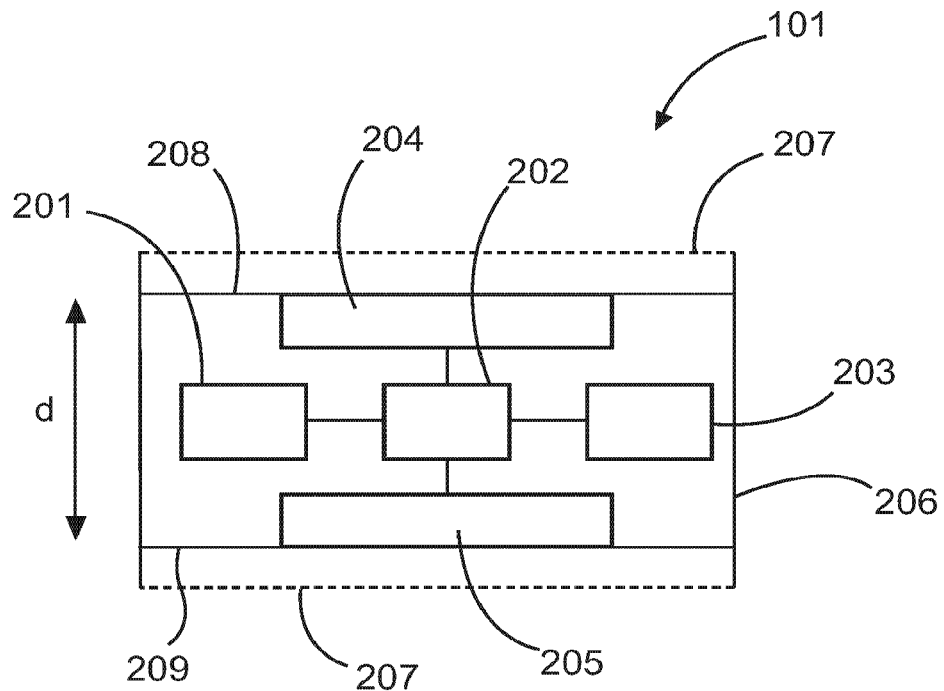

FIG. 2 schematically shows a structure of a self-sufficient sensor according to one embodiment.

Figure 3:
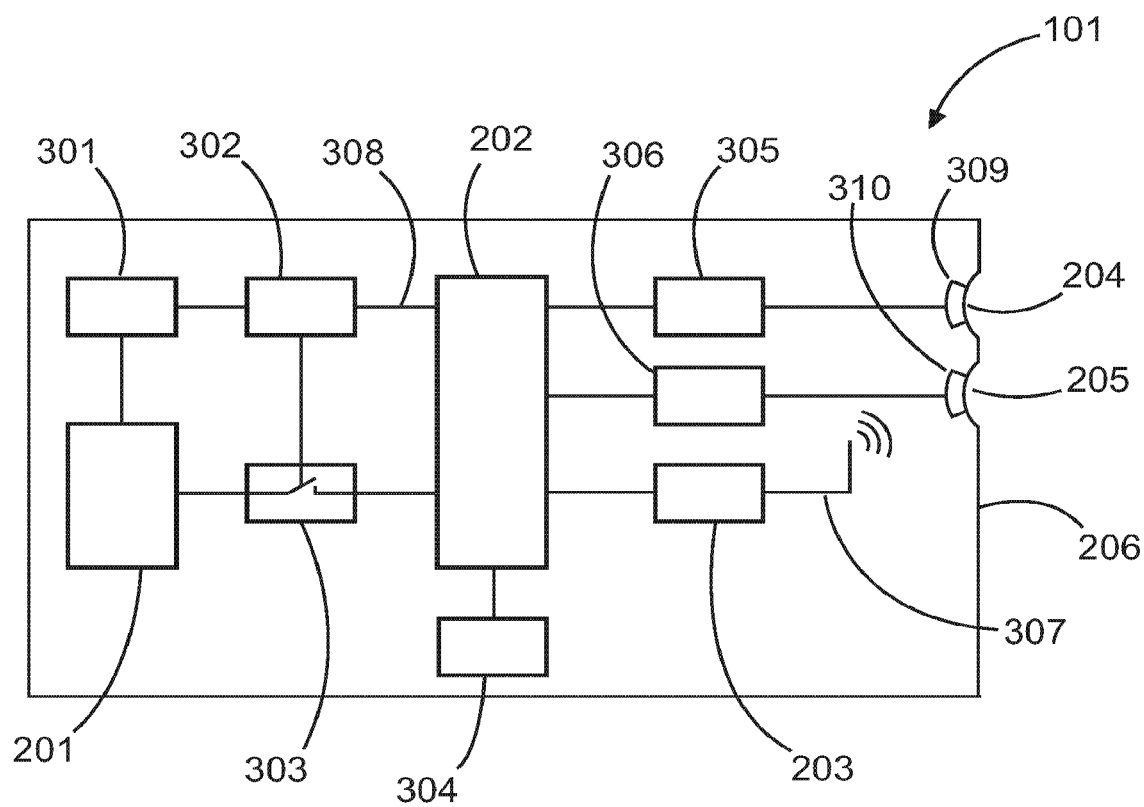

FIG. 3 schematically shows a structure of a self-sufficient sensor on the basis of a function-oriented principle representation in a higher level of detail according to an embodiment.

Figure 4:
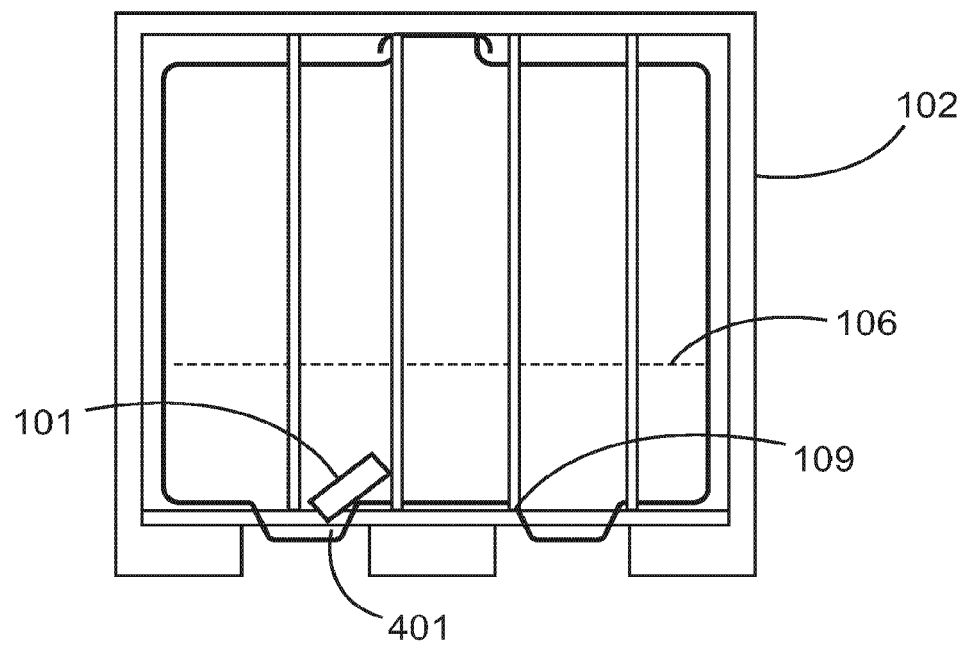

FIG. 4 schematically shows a stand-alone sensor for level, limit level or pressure measurement of at least one medium in a transport container according to a further embodiment.

Figure 5:
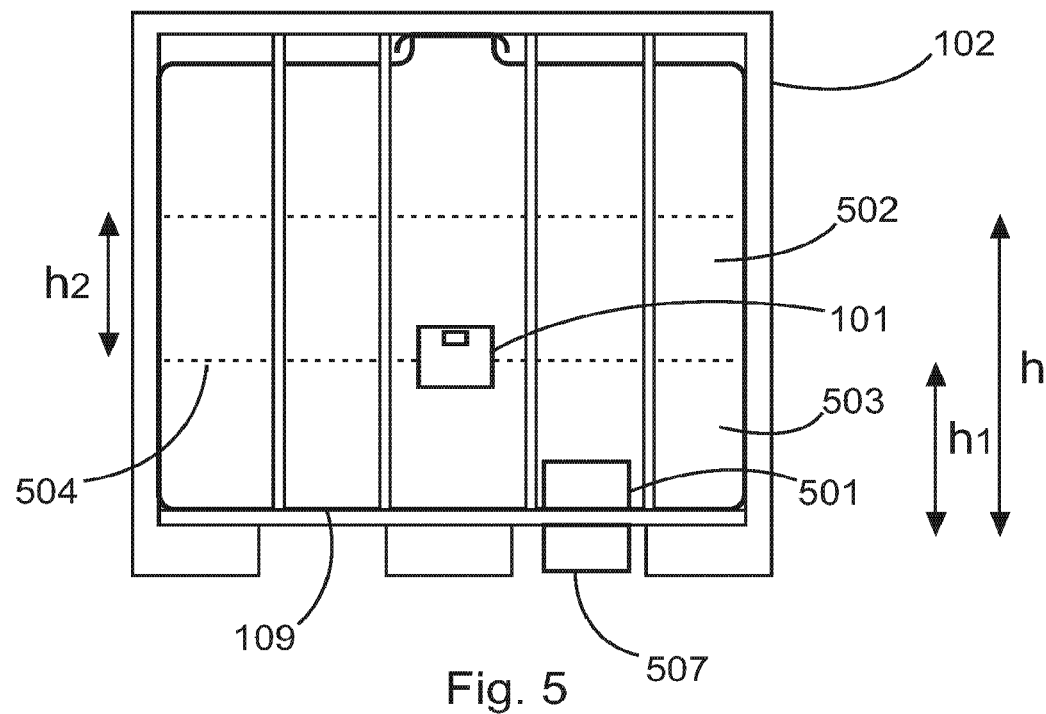

FIG. 5 schematically shows a stand-alone level, limit level or pressure measuring system for detecting a medium mixture in a transport container according to one embodiment.

Figure 6:
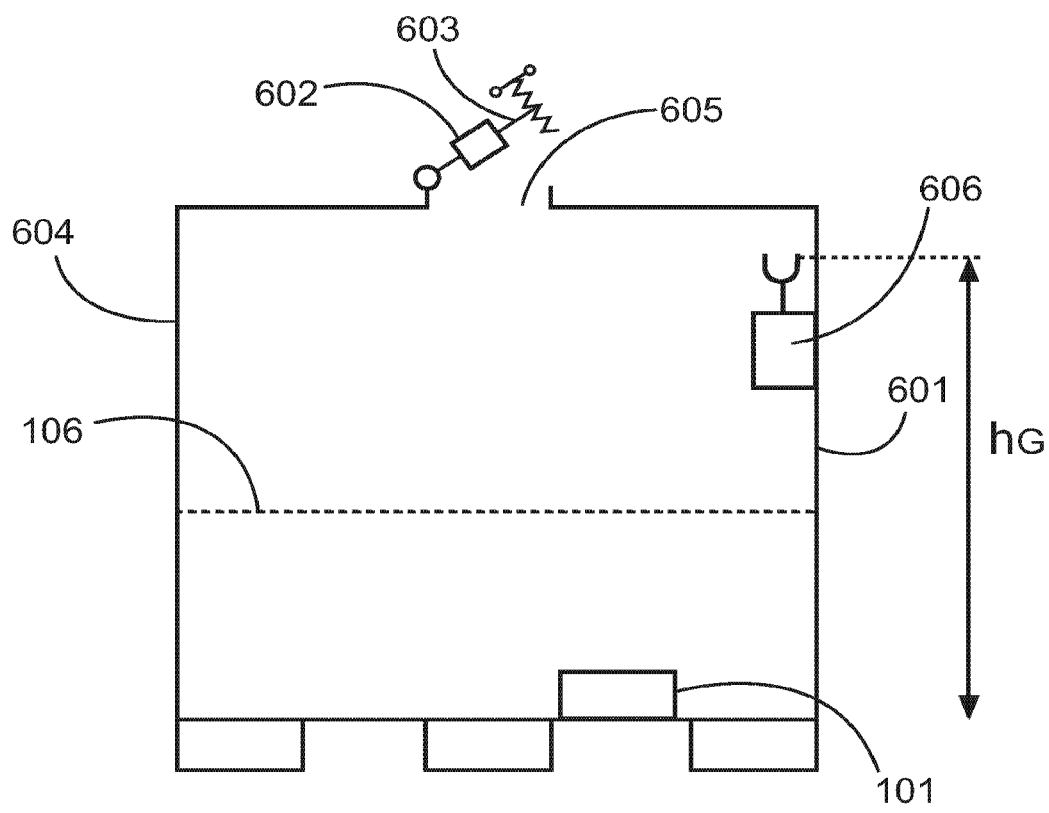

FIG. 6 schematically shows an autonomous level, limit level or pressure measuring system for detecting at least one medium in a transport container according to one embodiment.

Figure 7:
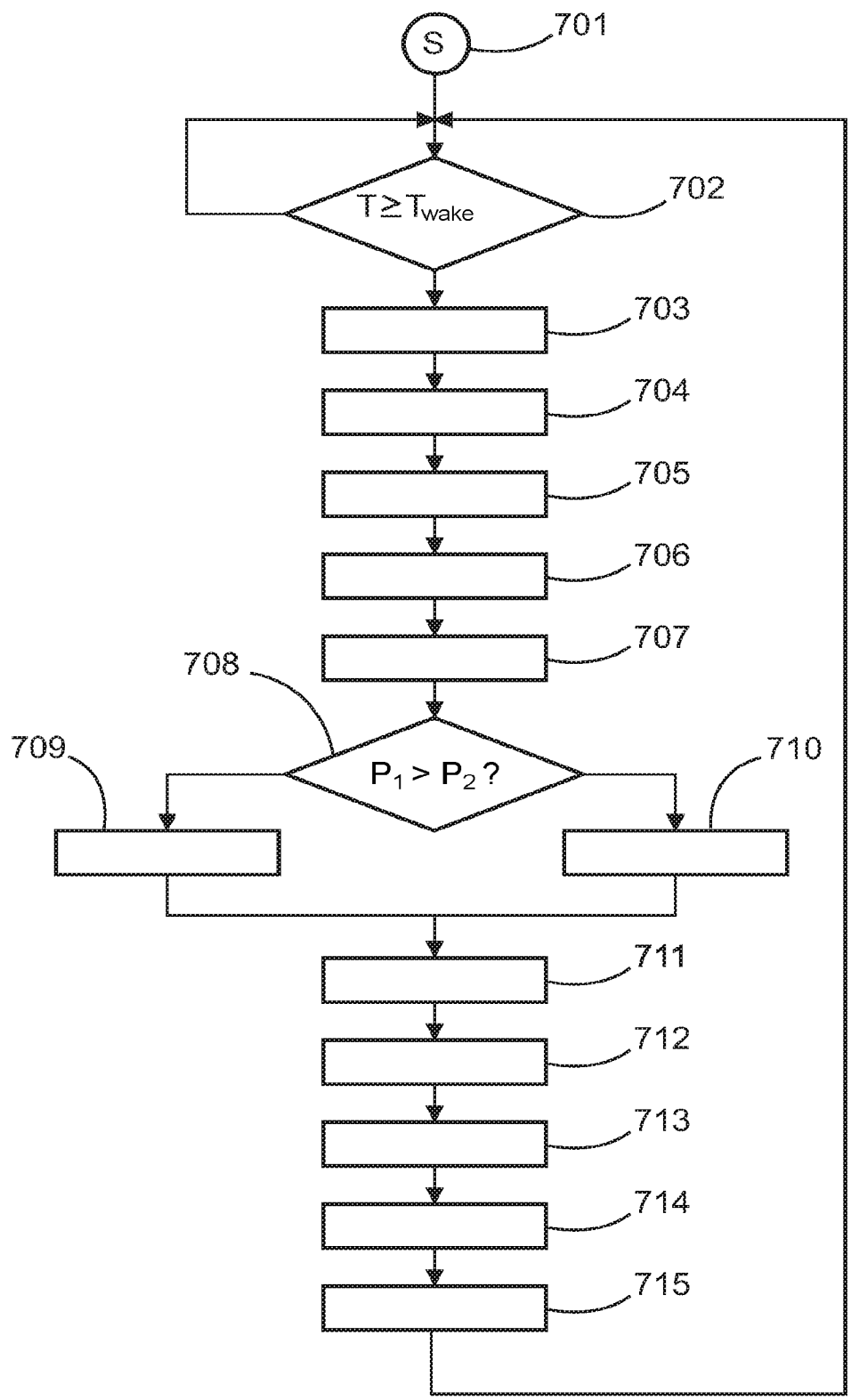

FIG. 7 schematically shows a flow diagram of a method for detecting a filling level or a limit level or a pressure of at least one medium or for interface measurement of a medium mixture in a transport container according to one embodiment.

DETAILED DESCRIPTION OF EMBODIMENTS

FIG. 1 shows a self-sustaining sensor 101 for detecting a level or a threshold level or a pressure of at least one medium 106 in a transport container 102. The self-sustaining sensor 101 is configured to rest on the bottom 109 of the container 102 during measurement, without being attached to the container.

For example, FIG. 1 shows the arrangement, an installation or a mounting of the self-sufficient sensor on an IBC container 102. The weight, volume and cost optimized container 102 is particularly popular in the distribution and logistics industry, and allows for easy supply of a wide variety of media to customers. The IBC container 102 has a container opening 107, a pallet 103, a metal frame 104 and a container bladder 105, preferably made of plastic, which contains the medium 106.

The self-sustaining sensor 101 may be configured such that, during installation or assembly, the self-sustaining sensor may be introduced or dropped into the container through the lid opening or the container opening 107 and may sink into the medium 106 to be measured under the influence of gravity. In other words, the self-sufficient sensor 101 may be drained into the interior 108 of the container 102 through the lid opening such that the sensor may sink through the medium 106, which may be a liquid, towards the bottom 109 of the container. Thus, once mounted, the self-sustaining sensor 101 can be located substantially at the bottom 109 of the container as a result of gravity and can thus begin measuring, for example, to determine a level h of the product or medium 106. Due to the mounting within the container 102, an uncontrolled detachment and removal of the self-sufficient sensor 101 from the container 102 can be basically excluded. If the container 102 has an opening for emptying in the region of the container base, provision may be made to design the mechanical contours and dimensions of the self-sufficient sensor 101 in such a way that closing of the container opening or washing out during an emptying operation can be prevented.

Furthermore, FIG. 2 schematically shows the basic structure of the self-sufficient sensor 101, which comprises a closed housing 206 adapted to be submerged in the at least one medium 106, and a sensor element assembly comprising one or more sensor elements 204, 205 arranged in or on the housing 206.

The housing 206 may be configured to prevent the medium from entering the interior of the self-sustaining sensor 101.

For example, FIG. 2 shows that the sensor element arrangement comprises two sensor elements 204, 205, namely the first sensor element 204 and the second sensor element 205, which are arranged opposite to each other and may be adapted to sense a physical property of the medium 106 directly and/or substantially completely surrounding the sensor 101.

The self-sustaining sensor 101 further comprises an evaluation device 202 or measured value determination device, which may be integrated in the sensor, for example in the form of a processor, and may be arranged to determine at least one measured value, for example a fill level or a fill level h in the container 102, on the basis of the measured physical property of the medium 106 having the density ρ by the first sensor element 204 and/or the second sensor element 205.

For example, the two sensing elements may be a first pressure sensing element 204 and a second pressure sensing element 205, which may be a first pressure sensing element 204 and a second pressure sensing element 205, respectively, and are arranged to determine a first measured value and a second measured value of the at least one medium, for example based on a pressure measurement principle. For example, the evaluation device 202, in cooperation with a first pressure measurement cell 204 arranged on a first surface 208 of the housing 206, may determine a first measured value or pressure value $P_1$, which may directly depend on the filling level h and the density ρ of the medium 106. Furthermore, the hydrostatic pressure $P_{Hyd}$ generated by the medium 106, which depends on the previous parameters, is added to the pressure of the superimposed atmosphere $P_{At}$. Depending on the requirements for the accuracy of the level measurement, which can tolerate an error up to several centimeters, the superimposed gas pressure can be estimated as $P_{A\_t\_norm}=1013$ mBar in a plurality of cases. Furthermore, the same medium 106 with a known density is often transported from a supplier to a customer in the container 102, which makes it possible to pre-input the density before mounting it on the sensor. Thus, the parameters can be known and the evaluation device 202 can determine the level h from the measured pressure $P_1$ by subtracting the assumed atmospheric pressure $P_{A\_t\_norm}$ and ultimately dividing the difference by the product of the acceleration due to gravity and the pre-parameterized density ρ in a good approximation.

Additionally, a second pressure sensor element or cell 205 may be provided in the self-sustaining sensor 101, which is arranged on a second surface 209 of the housing 206 substantially opposite to the first surface. Due to the distance d, the measurement in the medium 106 may result in different pressure values $P_1$ at the measurement point of the first pressure sensor 204 and $P_2$ at the measurement point of the second pressure sensor 205. The evaluation device 202 may be arranged to continuously detect the density ρ of the medium 106 in the container 102 on the basis of the absolute difference of the two pressure values, which is divided by the product of the acceleration due to gravity and the distance d, to minimize the error, to increase the measurement accuracy and thus to optimize the measurement.

Furthermore, the self-sufficient sensor 101 may further comprise a spacer grid 207, which is provided outside the housing 206 or on the housing 206 and may be arranged to prevent the sensor 101 from being washed out during an emptying of the container 102 by a corresponding extension of the mechanical dimensions of the self-sufficient sensor 101. Furthermore, the spacer grid 207 may be arranged to prevent a possible falsification of the measured values or pressure values determined by the sensor elements 204, 205 by a possible resting of the self-sufficient sensor 101 on the container bottom 109 under load of one of the measuring cells 204, 205. Thus, a simple and at the same time safe installation or mounting of the self-sufficient sensor on or in a container can advantageously be enabled.

Further, the self-sustaining sensor 101 includes a communication module or device 203 disposed within the housing 206 and configured to wirelessly transmit or communicate a detected reading to the outside through the housing.

Further, the stand-alone sensor 101 comprises a power supply 201, which may be, for example, an energy storage device 201 such as a battery 201 or an accumulator, which supplies power to the complete sensor system. The energy supply is arranged in the housing 206 and may be adapted to be activated by means of an energy saving module.

For example, the determined measured value, such as the level h, may be communicated or transmitted to the outside via the communication device 203, wherein the communication device 203 may be implemented in the special energy-saving module. It may be envisaged that the stand-alone sensor 101 may be equipped with a radio technology which may be energy saving in terms of battery life, inexpensive in terms of manufacturing costs and very robust in terms of acceptable path attenuation in terms of the need to penetrate at least one medium 106.

The stand-alone sensor 101 or the communication device 203 may be configured to transmit the radio signal using a low-frequency narrowband radio technology, such as LPWAN, or a long range narrowband radio technology with a radio frequency below 1 GHz, in particular below 500 MHz. The low frequency narrow band radio technology may be available at low cost and low power by integration in commercially available semiconductor devices. For example, an LPWAN may be LoRa, Sigfox, NB-IoT, or MIOTY. However, other radio technologies below 1 GHz can also be used. In principle, the range of the aforementioned technologies may be massively reduced under the influence of a medium 106 to be passed between a transmitter, such as the autonomous sensor 101, inside the container 102 and a receiver outside the container, especially in the case of the conductive medium 106. However, it may be envisaged that the reduced range may still be sufficient to reach a base station installed in the vicinity of the container 102.

FIG. 3 further illustrates the structure of a self-sufficient sensor 101 in FIG. 2 by means of a function-oriented principle illustration in a higher level of detail. In addition to the power supply 201, the self-sufficient sensor 101 further comprises a timer 301, a logic circuit 302 arranged between the timer 301 and the evaluation device 202, and a switching element 303 arranged to connect the power supply 201, the logic circuit 302 and the evaluation device 202. The timer 301 may be arranged in the housing 206 and adapted to activate the power supply 201 at a predetermined time interval. For example, the timer 301 may be arranged to trigger, after the lapse of 4 hours, a switching pulse which is passed from the logic circuit 302 to a switching element 303 which may be, for example, a relay or a transistor circuit.

For example, it may be provided that the evaluation device 202, which may be formed as a processor 202, may be supplied with the energy by the closing or switching on of the switching element 303 and may start a sequence program for performing a measurement. Furthermore, it may be provided that the processor 202 may activate a self-stop signal 308. Further, it may be provided that during the program execution, the evaluation device 202 may evaluate at least one physical measured value, which may be a third measured value. The third measured value may be, for example, a pressure value $P_1$, may be dependent on the surrounding medium 106 and may be determined by the processor 202 by means of measured value determination devices 305, 306, for example pressure determination circuits 305, 306. The circuits 305, 306 may be arranged to determine at least one pressure using one of the first and second pressure sensing elements or pressure sensing cells 204, 205, for example a ceramic or a metallic pressure sensing cell 204, 205. Alternatively to FIG. 2, the two pressure sensor elements or pressure sensing element 204, 205 may be arranged laterally on a same surface of the housing 206 and may be at different heights with a distance d during the measurement.

In order to save costs and in view of reduced accuracy requirements, it may also be envisaged to implement the pressure sensing elements 204, 205 by means of specially designed housing sections which bend under the influence of an external pressure. In this case, bending may be detected by the strain gauges 309, 310. It may also be envisaged to use low cost semiconductor pressure sensors.

It may also be envisaged that the sensor housing 206 may seamlessly surround the self-sustaining sensor 101 to hermetically seal it from the medium 106, which may contribute to particularly low-cost manufacturing. The evaluation device 202 may be arranged to determine a third measured value or a filling level h on the basis of the measured physical quantities, namely the first and second measured values or pressure values $P_1$ and $P_2$.

Further, the self-sustaining sensor 101 further comprises a tilt sensor element 304 disposed within the housing 206 and configured to determine the tilt of the self-sustaining sensor.

FIG. 4 shows that the evaluation device 202 can be set up to take into account, in particular, also the inclination of the self-sufficient sensor 101 relative to the perpendicular determined by the inclination sensor element 304 and to determine the filling level h with higher accuracy. The determined filling level h can be passed on or transmitted by the evaluation device 202 to the communication device 203, for example to a LoRa modem 203, and radiated wirelessly to the outside through the surrounding medium 106 in the direction of a receiver using an antenna 307 integrated in the sensor 101.

The provision and use of the tilt sensor element 304 is advantageous, particularly when a mobile or stationary container 102 has a bottom surface 109 that is not flat, as shown in FIG. 4. It may be possible for the self-sustaining sensor 101, once placed in the container 102, to sink in a largely uncontrolled manner under the influence of gravity in the direction of the container bottom 109 through the medium 106 and remain at a randomly occurring location 401 on the container bottom 109. Consequently, it cannot be assumed that the self-sustaining sensor 101 will remain in a predefined angular position relative to the perpendicular to the container base. By taking into account a fourth measurement value, which is determined by the tilt sensor element 304 and is for example a tilt angle of the sensor, an output of an error signal can be controlled during the measurement to improve the measurement accuracy. For example, if the sensor 101 remains lying on its envelope surface at the bottom of the container, the sensor may be arranged to determine the level h of the medium 106 based on one of the first and second pressure values by means of the evaluation device 202. Alternatively or additionally, the sensor may be arranged to no longer perform a density measurement due to the pressure sensing cells 204, 205 being at the same height. Consequently, the sensor can be set up to output an error message, to use a last known density value and/or to use a previously parameterized density value for the determination of the filling level h. If the sensor 101 remains at an angle as shown in FIG. 4, the resulting height difference dies can be determined from the known distance d and the angle of inclination of the sensor 101, and thus the measurement accuracy can be improved.

FIG. 5 shows a self-sufficient level, limit level or pressure measurement system for detecting a medium mixture in a transport container, which has at least two self-sufficient sensors, namely a first self-sufficient sensor 101 and a second self-sufficient sensor 501.

For example, the container 102 stores a media mixture of at least two media 502, 503 having different densities $\rho_1, \rho_2$. For example, the two media may be a hydrocarbon as the first media such as an oil 502 having a first density $\rho_1$ and a water-based media as the second media such as water 503 having a second density $\rho_2$, wherein the water 503 is overlaid by the oil 502 and there is a separation layer 504 between the two mutually immiscible media 502, 503.

The stand-alone level, point level or pressure measurement system is arranged such that the first stand-alone sensor 101 has a different density than the second stand-alone sensor 501. Furthermore, the self-sufficient level, point level or pressure measurement system may be arranged such that the first self-sufficient sensor 101 has a density between the first density $\rho_1$ and the second density $\rho_2$, for example 0.9 g/cm$^3$, while the second self-sufficient sensor 501 has a density greater than the second density $\rho_2$, for example greater than 1 g/cm$^3$. With the different densities, the second self-sufficient sensor 501 may sink to the bottom 109 of the container 102 during assembly or measurement, whereas the first self-sufficient sensor 101 may float on the interface 504 between the first medium oil 502 and the second medium water 503. The second self-sufficient sensor 501 may be configured according to the principles set out above, for example on the basis of one or more pressure measurements, to determine the first filling level $h_1$ of the first medium 502 on the basis of the first density $\rho_1$ of the first medium 502, to determine the second filling level $h_2$ of the second medium 503 on the basis of the second density $\rho_2$ of the second medium 503, and to send or transmit the two filling levels wirelessly to the outside.

In particular, a receiver 507 may be provided, which may be arranged outside the container 102 or below the container or external to the container, to receive the radio signals and the measured values from the first and second autonomous sensors 101, 501.

For example, the receiver 507 may receive, as an evaluation device or as a cloud, the measured value or the first filling level $h_1$ of the first self-sufficient sensor 101 and store it for further processing. It may further be provided that the second self-sufficient sensor 501 may receive this measured value, namely the first filling level $h_1$, directly from the first self-sufficient sensor or via the receiver 507 by means of a further communication device (not shown) and determine a further physical measured value on the basis of the received measured value and using measuring principles that are identical or different compared to the first self-sufficient sensor 101. For example, the pressure value at the bottom of the container 109, then using the known second density $\rho_2$ of the second medium 503, the second fill level $h_2$ up to the interface 504 and from this the total fill level h can be determined and transmitted wirelessly to the outside. The measured values can be received by a receiver 507 attached to the outside of the container 102, or alternatively received by a further external receiver not shown here, processed further and/or in particular forwarded to an inventory control system or a cloud.

Thus, the stand-alone level, point level or pressure measurement system can be advantageously used for interface measurement of a media mixture in a transport container. In addition, it can be used to optimally monitor interface layers in process vessels or to monitor a separation process.

The principle of providing multiple sensors 101, 501 with defined different densities to achieve buoyancy on a predefined media boundary layer 504 can in principle be applied to other combinations or in applications with a plurality of boundary layers 504. In view of the embodiment example set out above, it may also enable applications with multiple boundary layers and sensors suitable therefor to be equipped.

It may also be envisaged to design a self-sufficient sensor with a very low density which, floating on top, may allow the continuous determination of the superimposed gas pressure. If this is transmitted to a cloud and/or to other sensors 101, 501 located in the respective container, the measurement accuracy can be improved thereby.

The embodiments and application scenarios shown so far aim at transmitting the measured values from the sensor 101, 501 via a wireless communication technology through the respective medium 106, 502, 503 and the container wall 105 towards a receiver, for example a gateway. Due to possibly existing conductivities of the media 106, 503, the signal is strongly attenuated when passing through the same, which can be accepted with regard to the short distance in the medium and the high attenuation of the signals due to the radio technology, but acceptable according to the invention. On the other hand, an application in a metallic container 601, as shown in FIG. 6, cannot be considered due to the principle of the complete shielding of the radio signals.

FIG. 6 shows that a gateway 602 may be provided for the self-sustaining sensor 101, 501 and may be adapted to be arranged or mounted on a metallic container 601 or on the container wall 604 or on the lid 603 of the container 601 and to receive the radio signal from the communication device 203 of the self-sustaining sensor 101 and/or to transmit the radio signal to a receiver 507 external to the container. The lid 603 of the container may be configured as a replacement lid 603. Advantageously, the self-sufficient sensor 101, 501 and the self-sufficient level, limit level or pressure measurement system with the gateway 602 can thus also be applied to a metallic container 601, even if the metallic container 601 often cannot be provided with additional openings 605 at arbitrary points due to its construction. FIG. 6 shows a container gateway 602 integrated in the lid 603, which is set up to receive the radio signals from the sensors 101, 606 located in the container 601 and to radiate them outwards again via a second antenna located on the outside of the lid.

The gateway 602 may be provided internally on the container, for example near the opening, or on the inside of the lid. In contrast to a direct installation of, for example, a radar level sensor in the lid 603, it may thus be advantageous that the functionality of the level measurement can be ensured both with the container lid 603 closed and with the container lid 603 open. The level, limit level or pressure measurement can thus be continued without restriction, in particular during filling or emptying via a tube inserted into the opening 605.

FIG. 6 further shows that a self-sustaining level, limit level, or pressure measurement system further comprises a limit level sensor 606 configured to be mounted laterally on the inner wall of the container 601 and to output a warning signal to the outside. The limit level sensor 606 may be, for example, a tuning fork sensor 606 which is mounted via a magnetic mount in the upper region of the container 601 and may be arranged to provide or output an alarm signal to the outside of the container 601 when the mount-adjustable fill level $h_G$ is reached. The magnetic holder shown can also be used with a conventional plastic tank if a corresponding mechanically fixed or height-adjustable metal plate is provided on the outside of the container.

It may be noted at this point that a stand-alone sensor 101, 501 may be arranged to determine a level or limit using different physical principles. Conceivably, for example, capacitive or conductive sensor elements, vibronic sensor elements, temperature sensor elements or chemical sensor elements such as PH value sensor elements may be used as sensor elements of the sensor element arrangement as an alternative to the pressure sensor elements 204, 205.

It may be provided when using a plurality of autonomous sensors 502, 503 for a measurement system or also when using container gateways 602 to synchronize the measurement times of the timers 301 installed in the respective components so that the components involved in a respective measurement are activated at substantially the same time. Synchronization of the timers 301 may also be provided in a manner known to the skilled person.

It may also be provided that the self-sustaining sensors 101, 501 may comprise a means for disassembly. Thus, it may be provided to form surface elements in such a way that they are detected by a magnet which is introduced, for example, by a user through the opening 605 of the container 102, 601. By removing the service magnet from the container, the self-sufficient sensor 101, 501 can thus also be removed again from the container or a groundwater well.

FIG. 7 shows a flow diagram of a method using a self-sustaining sensor 101, 501 for detecting a level or a threshold level or a pressure of at least one medium 106 or for interface measurement of a mixture of media 502, 503 in a transport container 102, 601.

The method starts with the initial state in the first step 701, in which a self-sufficient sensor 101, 501 comprising a closed housing 206 and a sensor element arrangement comprising one or more sensor elements 204, 205 is provided and arranged to rest on the bottom of the container and/or to float on a separation layer 504 of the medium mixture 502, 503 without being attached to the container. For example, the sensor element arrangement comprises two sensor elements which are a first pressure sensor element 204 and a second pressure sensor element 205 and and are arranged in the housing 206 of the self-sustaining sensor 101, 501 opposite to each other. In step 702, when the self-sufficient sensor 101, 501 is activated by an internal power supply 201, the measurement is performed at a predetermined time interval by means of a timer 301. For this purpose, it is checked whether the current time T of the timer 301 is greater than or equal to the next pre-parameterized wake-up time $T_{Wake}$. If this is the case, in step 703 the evaluation device 202 or the processor 202 is supplied with power, and the program is loaded. In step 704, a first measured value or a first pressure value $P_1$ is determined by means of the first pressure sensor element 204. In step 705, a second measured value or a second pressure value $P_2$ is determined by means of the second pressure sensor element 205. In step 706, a tilt angle is read out by means of a tilt sensor element 304 of the stand-alone sensor 101, 501. In step 707, the density ρ of the surrounding medium 106, 502 is determined.

In step 708, a comparison of the first and second measured values $P_1$ and $P_2$ is used to check whether the stand-alone sensor is upright or upside down and whether the first pressure sensor element 204 and the second pressure sensor element 205 are arranged at different heights or whether $P_1 > P_2$ or $P_1 > P_2$. In steps 709, 710, a third measured value, for example the filling level h, is determined by means of an evaluation device 202 on the basis of the first and second measured values of the pressure sensor elements 204, 205 facing the container base 109. In the case of $P_1 = P_2$, the sensor may be arranged to determine the level h of the medium using one of the first and second pressure values. Alternatively or additionally, the sensor may be arranged to no longer perform a density measurement due to the first and second pressure sensor elements being at the same level. Consequently, the sensor may be arranged to output an error message, to use a last known density value and/or to use a pre-parameterized density value for determining the level h. If the autonomous sensor remains at an angle, the level can, for example, be determined taking into account the resulting height difference dies from the known distance d between the first and second pressure sensor elements 204, 205 and the angle of inclination, thus improving the measurement accuracy.

After activating the communication device 203 in step 711, in step 712 the level is transmitted wirelessly to the outside, the radio signal passing at least partially through the surrounding medium 106 in this case. In step 713, the communication device is deactivated before, in step 714, the processor or the evaluation device 202 transmits the time of the next measurement to the timer 301.

In step 715, the switching element 303 is reopened by the processor 202, thus deactivating again the complete system except for the timer 301 and thus assuming the state of maximum energy saving. Hereby, the lifetime of the battery 201 or the rechargeable battery 201 may be maximized, which may in particular allow the stand-alone sensor 101 to be implemented with a fixed battery that allows operation during many years. Advantageously, this can simplify manufacturing, reduce costs during manufacturing and during operation, and easily ensure the tightness of the sensor housing 206.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A self-sustaining sensor configured to detect a fill level, or a pressure of at least one medium in a transport container, the self-sustaining sensor comprising:
    a closed housing configured to be submerged in the at least one medium; and
    a sensor element arrangement comprising one or more sensor elements arranged in or on the closed housing,
    wherein the self-sustaining sensor is configured to sink into the medium, be completely surrounded by the medium, and rest on a bottom of the transport container, without being fixed to the transport container, and
    wherein the self-sustaining sensor comprises a shape and weight distribution that cause the self-sustaining sensor to assume a standing position, in which at least one of the one or more sensor elements can measure unobstructed by a wall of the transport container.

2. The self-sustaining sensor according to claim 1, wherein the one or more sensor elements are two sensor elements arranged opposite each other.

3. The self-sustaining sensor according to claim 2,
    wherein the two sensor elements are a first pressure sensor element and a second pressure sensor element, and
    wherein the first pressure sensor element is configured to determine a first measured value and the second pressure sensor element is configured to determine a second measured value of the at least one medium.

4. The self-sustaining sensor according to claim 3, further comprising:
    an evaluation device, which is arranged in the closed housing and is configured to determine a third measured value based on the first measured value and/or the second measured value.

5. The self-sustaining sensor according to claim 1, further comprising:
    a communication device arranged in the closed housing and is configured to transmit a detected measured value wirelessly to an outside through the closed housing.

6. The self-sustaining sensor according to claim 5, wherein the communication device is configured to transmit a radio signal using low-power wide-area network (LP-WAN) or long range narrow band radio technology with a radio frequency below 1 GHz.

7. The self-sustaining sensor according to claim 5, further comprising:
    a gateway configured to be located on the transport container, to receive a radio signal from the communication device, and to transmit the received radio signal to a receiver external to the transport container.

8. The self-sustaining sensor according to claim 1, further comprising:
    a power supply disposed in the closed housing and configured to be activated by a timer disposed in the closed housing at a predetermined time interval.

9. The self-sustaining sensor according to claim 1, further comprising:
    a tilt sensor element disposed in the closed housing and being configured to determine a tilt of the self-sustaining sensor.

10. A self-sustaining sensor configured to measure an interface of an emulsion mixture of media in a transport container, the self-sustaining sensor comprising:
    a closed housing configured to be submerged in the media; and
    a sensor element arrangement comprising one or more sensor elements arranged in or on the closed housing,
    wherein the self-sustaining sensor is configured to sink into the media and to float on interface of the emulsion mixture of media during measurement, without being fixed to the transport container.

11. The self-sustaining sensor according to claim 10, wherein a density of the self-sustaining sensor is between a density of water and a density of an oil.

12. A method of operating a self-sustaining sensor according to claim 10, the method comprising:
    arranging the self-sustaining sensor in the media in the transport container; and
    measuring an interface of the emulsion mixture of media in the transport container.

13. A self-sustaining fill level measurement system, limit level measurement system, or pressure measurement system, comprising:
    first and second self-sustaining sensors according to claim 10, wherein the first self-sustaining sensor has a different density than the second self-sustaining sensor.

* * * * *

UNITED STATES PATENT AND TRADEMARK OFFICE
CERTIFICATE OF CORRECTION

PATENT NO. : 12,372,393 B2
APPLICATION NO. : 17/906329
DATED : July 29, 2025
INVENTOR(S) : Roland Welle Page 1 of 1

It is certified that error appears in the above-identified patent and that said Letters Patent is hereby corrected as shown below:

In the Specification

In Column 14, Line 3, delete "dies" and replace with -- $d_{res}$ --

In Column 17, Line 17, delete "dies" and replace with -- $d_{res}$ --

Signed and Sealed this
Twenty-first Day of October, 2025

John A. Squires
*Director of the United States Patent and Trademark Office*